United States Patent
Lunden et al.

(10) Patent No.: US 9,743,428 B2
(45) Date of Patent: Aug. 22, 2017

(54) METHOD AND APPARATUS FOR NETWORK ASSISTED DATA TRANSFER SCHEDULING

(75) Inventors: Petteri Lunden, Espoo (FI); Osman Yilmaz, Espoo (FI); Carl Wijting, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/420,131

(22) PCT Filed: Aug. 8, 2012

(86) PCT No.: PCT/IB2012/054052
§ 371 (c)(1),
(2), (4) Date: Feb. 6, 2015

(87) PCT Pub. No.: WO2014/024002
PCT Pub. Date: Feb. 13, 2014

(65) Prior Publication Data
US 2015/0173103 A1    Jun. 18, 2015

(51) Int. Cl.
*H04W 74/04* (2009.01)
*H04L 29/08* (2006.01)
*H04W 36/22* (2009.01)

(52) U.S. Cl.
CPC ......... *H04W 74/04* (2013.01); *H04L 67/1097* (2013.01); *H04L 67/322* (2013.01); *H04L 67/325* (2013.01); *H04W 36/22* (2013.01)

(58) Field of Classification Search
CPC . H04W 16/04; H04W 16/10; H04W 28/0289; H04W 28/08; H04W 28/20;
(Continued)

(56) References Cited

U.S. PATENT DOCUMENTS 6,418,148 B1 * 7/2002 Kumar ............. H04W 72/0413
                                                370/330
6,628,611 B1 * 9/2003 Mochizuki ............. H04L 47/10
                                                370/229
(Continued)

FOREIGN PATENT DOCUMENTS

EP    1349049 A    10/2003
EP    1881718      1/2008
(Continued)

OTHER PUBLICATIONS

International Search Report and Written Opinion received for corresponding Patent Cooperation Treaty Application No. PCT/IB2012/054052, dated Sep. 30, 2013, 17 pages.
(Continued)

*Primary Examiner* — Michael Thier
*Assistant Examiner* — Eric Nowlin
(74) *Attorney, Agent, or Firm* — Alston & Bird LLP

(57) ABSTRACT

A method, apparatus, computer program product and system are provided for scheduling support for cloud services. From the perspective of a client device, a method is provided that includes causing a support request to be transmitted and receiving an indication message. The support request includes an indication of an amount of data associated with a support task and an indication of an urgency of the support task. The method further includes determining whether to wait for or reject the support task. If it is determined to wait, the method includes performing one or more idle functions, receiving a ready indication, and determining whether to proceed with or cancel the support task. If it is determined to proceed with the support task, the method further includes causing an acceptance indication to be transmitted and receiving or causing to be transmitted, the data associated with the support task.

15 Claims, 6 Drawing Sheets

(58) Field of Classification Search
CPC ............. H04W 28/24; H04W 36/0005; H04W 36/0011; H04W 36/08; H04W 36/14; H04W 36/16; H04W 36/22; H04W 36/26; H04W 48/08; H04W 52/343; H04W 72/04; H04W 72/042; H04W 72/0446; H04W 72/0453; H04W 72/0486; H04W 72/12; H04W 72/1252; H04W 74/04; H04W 76/041; H04W 84/045; H04W 84/12; H04W 88/08; H04W 12/06; H04W 28/16; H04W 28/18; H04W 48/20; H04W 88/085; H04W 88/12; H04L 12/5695; H04L 41/0896; H04L 47/10; H04L 47/125; H04L 47/2441; H04L 47/788; H04L 63/10; H04L 67/322; H04L 67/325

See application file for complete search history.

(56) References Cited

U.S. PATENT DOCUMENTS

| | | | |
|---|---|---|---|
| 6,831,902 B1 * | 12/2004 | Dougherty | H04L 12/4608 370/328 |
| 6,975,613 B1 * | 12/2005 | Johansson | H04W 72/12 370/331 |
| 6,985,931 B2 * | 1/2006 | Dowling | G06Q 20/04 370/401 |
| 7,031,336 B2 * | 4/2006 | Scherzer | H04W 28/18 370/338 |
| 7,035,932 B1 * | 4/2006 | Dowling | G06Q 20/04 709/230 |
| 7,197,569 B2 * | 3/2007 | Dowling | G06Q 20/04 370/401 |
| 7,293,110 B2 * | 11/2007 | Dowling | G06Q 20/04 370/331 |
| 7,720,098 B1 * | 5/2010 | Allen | H04W 28/20 370/464 |
| 7,738,488 B2 * | 6/2010 | Marsico | H04L 63/0892 370/315 |
| 7,800,534 B1 * | 9/2010 | Yenney | G01S 19/215 342/357.54 |
| 7,970,011 B2 * | 6/2011 | Carlson | H04L 12/2602 370/447 |
| 8,041,319 B2 | 10/2011 | He et al. | |
| 8,170,056 B2 * | 5/2012 | Allen | H04W 28/20 370/329 |
| 8,306,502 B2 * | 11/2012 | Varsavsky Waisman-Diamond | G06Q 20/10 455/405 |
| 8,634,392 B2 * | 1/2014 | Stephens | H04W 88/00 370/313 |
| 8,671,407 B2 * | 3/2014 | Ballani | H04L 67/101 718/1 |
| 8,849,112 B2 * | 9/2014 | Crowe | H04L 47/72 398/45 |
| 8,885,565 B2 * | 11/2014 | van de Ven | H04W 76/02 370/328 |
| 9,066,214 B1 * | 6/2015 | Yarkosky | H04W 4/16 |
| 9,191,976 B2 * | 11/2015 | Stephens | H04W 88/00 |
| 9,516,700 B1 * | 12/2016 | Rybak | H04W 24/02 |
| 9,519,500 B2 * | 12/2016 | Ballani | H04L 67/101 |
| 2002/0028679 A1 * | 3/2002 | Edwards | H04W 28/20 455/452.2 |
| 2003/0033359 A1 | 2/2003 | Asoh | |
| 2004/0015602 A1 * | 1/2004 | Goldhammer | H04L 12/5695 709/235 |
| 2004/0229621 A1 * | 11/2004 | Misra | H04W 16/08 455/445 |
| 2005/0036460 A1 * | 2/2005 | Dougherty | H04L 12/4608 370/328 |
| 2005/0198199 A1 * | 9/2005 | Dowling | G06Q 20/04 709/217 |
| 2006/0079228 A1 * | 4/2006 | Marsico | H04L 63/0892 455/433 |
| 2006/0099952 A1 * | 5/2006 | Prehofer | H04W 36/24 455/440 |
| 2006/0109799 A1 * | 5/2006 | Tseng | H04L 45/02 370/254 |
| 2006/0140161 A1 * | 6/2006 | Stephens | H04W 88/00 370/338 |
| 2007/0054645 A1 * | 3/2007 | Pan | H04W 24/08 455/266 |
| 2008/0085723 A1 * | 4/2008 | Tsao | H04W 16/08 455/452.2 |
| 2009/0156211 A1 | 6/2009 | Hande et al. | |
| 2010/0120434 A1 * | 5/2010 | Hasegawa | H04W 36/02 455/436 |
| 2010/0195611 A1 * | 8/2010 | Allen | H04W 28/20 370/329 |
| 2010/0254707 A1 * | 10/2010 | Peng | H04L 47/10 398/58 |
| 2010/0287559 A1 * | 11/2010 | Mergen | G06F 9/4893 718/103 |
| 2011/0070906 A1 | 3/2011 | Chami et al. | |
| 2011/0161488 A1 | 6/2011 | Anderson et al. | |
| 2011/0256870 A1 * | 10/2011 | Park | H04W 36/30 455/436 |
| 2011/0320588 A1 | 12/2011 | Raleigh | |
| 2012/0082131 A1 * | 4/2012 | Agrawal | H04W 36/08 370/331 |
| 2012/0096122 A1 | 4/2012 | Zhu et al. | |
| 2012/0147840 A1 * | 6/2012 | Chen | H04L 1/188 370/329 |
| 2012/0166331 A1 * | 6/2012 | Varsavsky Waisman-Diamond | G06Q 20/10 705/39 |
| 2012/0182864 A1 | 7/2012 | Heinz et al. | |
| 2012/0278812 A1 * | 11/2012 | Wang | G06F 9/505 718/104 |
| 2013/0014101 A1 * | 1/2013 | Ballani | H04L 67/101 718/1 |
| 2013/0170344 A1 * | 7/2013 | Crowe | H04L 47/72 370/230 |
| 2014/0092805 A1 * | 4/2014 | van de Ven | H04W 76/02 370/328 |
| 2014/0157274 A1 * | 6/2014 | Ballani | H04L 67/101 718/1 |
| 2014/0219191 A1 * | 8/2014 | Stephens | H04W 88/00 370/329 |
| 2015/0249954 A1 * | 9/2015 | Patil | H04W 48/16 370/338 |
| 2016/0029373 A1 * | 1/2016 | Seok | H04L 5/0055 370/338 |
| 2016/0226790 A1 * | 8/2016 | Lee | H04L 47/822 |
| 2017/0019927 A1 * | 1/2017 | Kim | H04L 5/0055 |
| 2017/0070390 A1 * | 3/2017 | Poola | H04L 41/0846 |

FOREIGN PATENT DOCUMENTS

| | | |
|---|---|---|
| EP | 2403290 A1 | 1/2012 |
| JP | 2003-058499 A | 2/2003 |
| JP | 2005-521336 A | 7/2005 |
| WO | 2011095618 | 8/2011 |
| WO | 2012/024088 A2 | 2/2012 |
| WO | 2012085158 | 6/2012 |
| WO | WO 2016164061 A1 * 10/2016 | H04L 29/06 |

OTHER PUBLICATIONS

E Morabet et al. "Adaptive handover time scheme for dynamic load balancing in LTE systems," Multimedia Computing and Systmes (ICMCS), 2012 International Conference on , vol., No., pp. 578, 582, May 10-12, 2012.

Office action received for corresponding Japanese Patent Application No. 2015-525950, dated Apr. 5, 2016, 5 pages of office action and 5 pages of office action translation available.

"Android Cloud to Device Messaging Framework", Android C2dm, Retrieved on Apr. 11, 2016, Webpage available at :http://code.google.com/android/c2dm/.

(56) References Cited

OTHER PUBLICATIONS

Mishra, "Advanced Cellular Network Planning and Optimisation", Wiley, Oct. 2006, pp. 544.

Xiao et al., "Cascap: Cloud-assisted Context-aware Power Management for Mobile Devices", Proceeding of ACM Mobisys Workshop on Mobile Cloud Computing and Services, Jun. 28, 2011, pp. 5.

Dinh et al., "A Survey of Mobile Cloud Computing: Architecture, Applications, and Approaches", Wireless Communications and Mobile Computing, vol. 13, No. 18, Dec. 25, 2013, pp. 01-38.

Extended European Search Report received for corresponding European Patent Application No. 12882619.5, dated Feb. 11, 2016, 11 pages.

* cited by examiner

METHOD AND APPARATUS FOR NETWORK ASSISTED DATA TRANSFER SCHEDULING

RELATED APPLICATION

This application was originally filed as PCT Application No. PCT/IB2012/054052 filed Aug. 8, 2012.

TECHNOLOGICAL FIELD

An example embodiment of the present invention relates generally to techniques for data transferal and, more particularly, to a method and apparatus for scheduling data transfers, such as for cloud service support.

BACKGROUND

Cloud computing allows shared resources to be provided to devices over a network connection, such as the Internet. For example, cloud computing may provide, for example, computation, software applications, data access, location, commerce, or storage services. The end-user of these services may not require knowledge of the physical location or configuration of the cloud computing system that delivers the services. Some end-users may even access cloud computing services wirelessly, such as via a cellular network or WLAN (wireless local area network).

Wireless devices may have a number of connectivity options to choose from. Each connectivity option may have different characteristics in terms of quality of service (QOS), power consumption, etc. Over time, the number of these connectivity options available will only continue to grow as additional technologies become available. For instance due to new technologies, band combinations and duplexing modes. As these options increase, scheduling data transmissions associated with cloud computing services can become complex. Hence, scheduling this traffic efficiently is a challenge, especially when multiple access points and/or multiple RATs (radio access technologies) are available.

BRIEF SUMMARY

A method, apparatus and computer program product are therefore provided according to an example embodiment of the present invention for scheduling support for cloud services. In this regard, the method, apparatus, and computer program product of one embodiment may allow cloud services to be efficiently scheduled with the assistance of a network access point by providing user equipment with an indication of a capacity for handling a request to support cloud services, or other large data transfers, such as large non-urgent data transfers. In this way, the method, apparatus, and computer program may allow scheduling decisions, such as whether to wait for support from the access point, whether to handover to another access point, or whether to delay the support request, to be more effectively made by the user equipment or the access point. It should be noted that the applicability of the invention is not limited to cloud service, but it can be applied as well to other types of traffic or services, for example software updates, backups, synchronizing content such as pictures taken with device camera, downloads of map content, or any non-urgent background task including transfer of large amount of data. In other words, UE requests support/assistance from network to schedule its non-urgent large data tasks (e.g. software updates, backups, synchronizing content such as pictures taken with device camera, downloads of applications, downloads of map content, synchronizing documents with cloud). In response, network applies long-term task scheduling based on e.g. link quality, UE mobility state, network load, traffic etc. enabling improved UE autonomous decisions of when to initiate the said tasks.

In one embodiment, a method is provided that includes causing a support request to be transmitted, the support request comprising at least one of an indication of an amount of data associated with a task or an indication of an urgency of the task. The method further includes receiving an indication message and determining, based at least in part on the indication message, whether to wait for or reject the task. According to another embodiment, the method may further include, in an instance in which it is determined to wait for the task: performing one or more idle functions; receiving a ready indication; determining whether to proceed with or cancel the task; and, in an instance in which it is determined to proceed with the task, causing an acceptance indication to be transmitted and receiving or causing the transmission of the data associated with the task.

In another embodiment, a method is provided that includes receiving a support request comprising at least one of an indication of an amount of data associated with a task or an indication of an urgency of the task. The method further includes determining, based on the support request, a capacity to support the task, causing an indication message comprising an indication of the capacity to be transmitted and determining whether supporting the task can be started. The method further includes, in an instance in which it is determined that supporting the task can be started, causing a ready indication to be transmitted, and, in an instance in which an acceptance indication has been received, supporting the task by receiving or causing the transmission of the data associated with the task.

In a further embodiment, an apparatus is provided that includes at least one processor and at least one memory including program code instructions, the at least one memory and the program code instructions being configured to, with the processor, direct the apparatus to at least cause a support request to be transmitted, the support request comprising at least one of an indication of an amount of data associated with a task or an indication of an urgency of the task. The apparatus is further caused to receive an indication message and determine, based at least in part on the indication message, whether to wait for or reject the task. According to another embodiment, the apparatus may be further caused to, in an instance in which it is determined to wait for the task: perform one or more idle functions; receive a ready indication; determine whether to proceed with or cancel the task; and, in an instance in which it is determined to proceed with the task, cause an acceptance indication to be transmitted and receive or cause the transmission of the data associated with the task.

In another embodiment, an apparatus is provided that includes at least one processor and at least one memory including program code instructions, the at least one memory and the program code instructions being configured to, with the processor, direct the apparatus to at least receive a support request comprising at least one of an indication of an amount of data associated with a task or an indication of an urgency of the task. The apparatus is further caused to determine, based on the support request, a capacity to support the task, cause an indication message comprising an indication of the capacity to be transmitted, and determine whether supporting the task can be started. The apparatus is further caused to, in an instance in which it is determined that supporting the task can be started, cause a ready indication to be transmitted, and, in an instance in which an acceptance indication has been received, support the task by receiving or causing the transmission of the data associated with the task.

In an even further embodiment, a computer program product is provided that includes a non-transitory computer readable medium storing program code portions therein. The computer program code instructions are configured to, upon execution, direct an apparatus to at least cause a support request to be transmitted, the support request comprising at least one of an indication of an amount of data associated with a task or an indication of an urgency of the task. The apparatus is further caused to receive an indication message and determine, based at least in part on the indication message, whether to wait for or reject the task. According to another embodiment, the computer program code instructions may be further configured to, upon execution, direct the apparatus to, in an instance in which it is determined to wait for the task: perform one or more idle functions; receive a ready indication; determine whether to proceed with or cancel the task; and, in an instance in which it is determined to proceed with the task, cause an acceptance indication to be transmitted and receive or cause the transmission of the data associated with the task.

In another embodiment, a computer program product is provided that includes a non-transitory computer readable medium storing program code portions therein. The computer program code instructions are configured to, upon execution, direct an apparatus to at least receive a support request comprising at least one of an indication of an amount of data associated with a task or an indication of an urgency of the task. The apparatus is further caused to determine, based on the support request, a capacity to support the task, cause an indication message comprising an indication of the capacity to be transmitted, and determine whether supporting the task can be started. The apparatus is further caused to, in an instance in which it is determined that supporting the task can be started, cause a ready indication to be transmitted, and, in an instance in which an acceptance indication has been received, support the task by receiving or causing the transmission of the data associated with the task.

In a still further embodiment, an apparatus is provided that includes means for causing a support request to be transmitted, the support request comprising at least one of an indication of an amount of data associated with a task or an indication of an urgency of the task. The apparatus further includes means for receiving an indication message and means for determining, based at least in part on the indication message, whether to wait for or reject the task. According to another embodiment, the apparatus may further include means for, in an instance in which it is determined to wait for the task: performing one or more idle functions; receiving a ready indication; determining whether to proceed with or cancel the task; and, in an instance in which it is determined to proceed with the task, causing an acceptance indication to be transmitted and receiving or causing the transmission of the data associated with the task.

In another embodiment, an apparatus is provided that includes means for receiving a support request comprising at least one of an indication of an amount of data associated with a task or an indication of an urgency of the task. The apparatus further includes means for determining, based on the support request, a capacity to support the task, means for causing an indication message comprising an indication of the capacity to be transmitted, and means for determining whether supporting the task can be started. The apparatus further includes means for, in an instance in which it is determined that supporting the task can be started, causing a ready indication to be transmitted, and means for, in an instance in which an acceptance indication has been received, supporting the task by receiving or causing the transmission of the data associated with the task.

In another embodiment, a system is provided that includes a user equipment and a first access point. The user equipment comprises a first apparatus comprising at least one first processor and at least one first memory storing first program code instructions. The at least one first memory and first program code instructions are configured to, with the at least one first processor, cause the first apparatus to at least cause a support request to be transmitted to the first access point, the support request comprising at least one of an indication of an amount of data associated with a task or an indication of an urgency of the task. The first apparatus is further caused to receive an indication of a capacity from the first access point and determine, based at least in part on the indication message, whether to wait for or reject the task. The first apparatus is even further caused to, in an instance in which it is determined to wait for or reject the task: perform one or more idle functions, receive a ready indication from the first access point, determine whether to proceed with or cancel the task, and in an instance in which it is determined to proceed with the task, cause an acceptance indication to be transmitted. The first access point comprises a second apparatus comprising at least one second processor and at least one second memory storing second program code instructions. The at least one second memory and second program code instructions are configured to, with the at least one second processor, cause the second apparatus to at least receive the support request; determine, based on the support request, a capacity to support the task; cause an indication message comprising an indication of the capacity to be transmitted; and determine whether supporting the task can be started. The second apparatus is further caused to, in an instance in which it is determined that supporting the task can be started: cause the ready indication to be transmitted, and in an instance in which the acceptance indication has been received, support the task by receiving or causing to be transmitted, the data associated with the task.

BRIEF DESCRIPTION OF THE DRAWINGS

Figure 1:
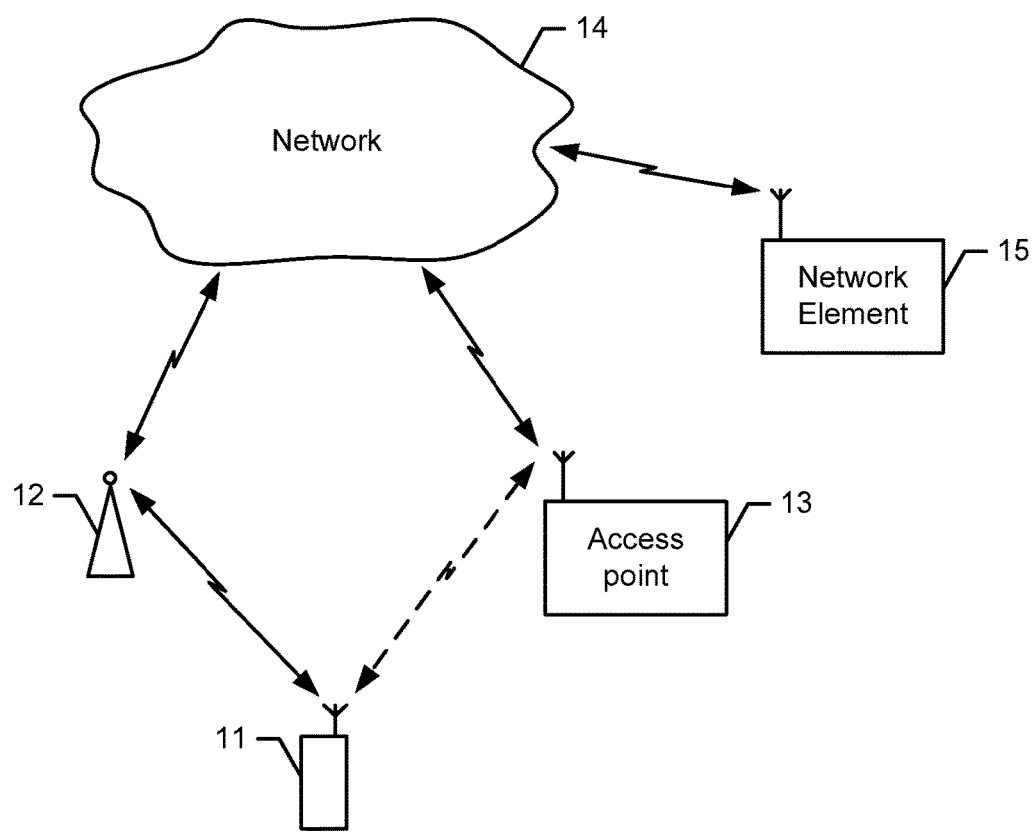
Figure 2:
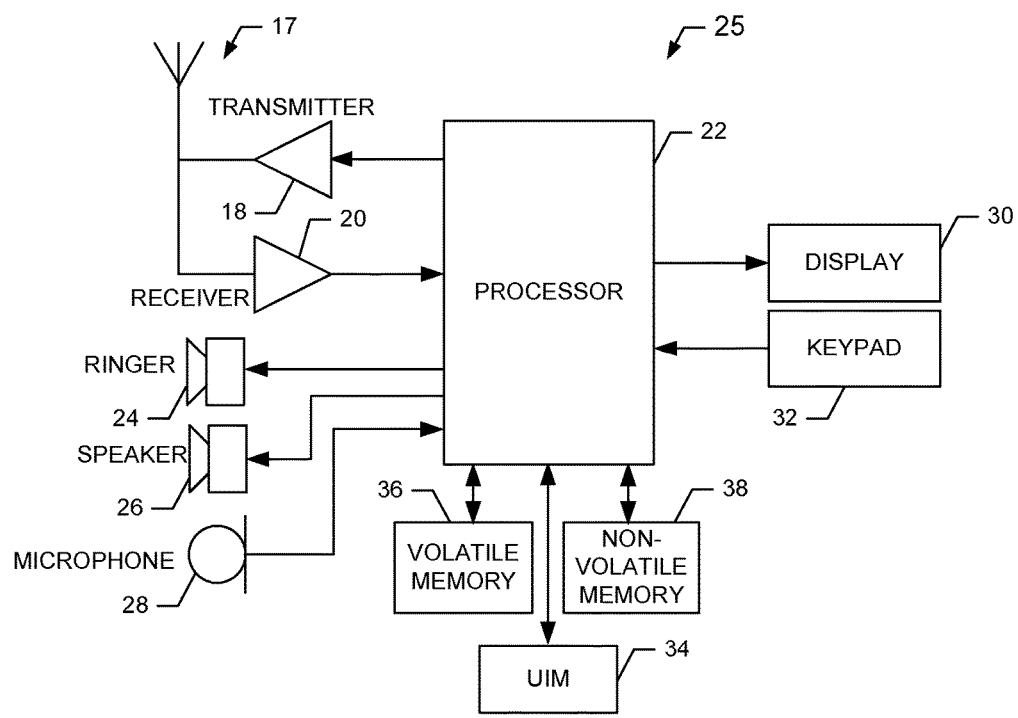
Figure 3:
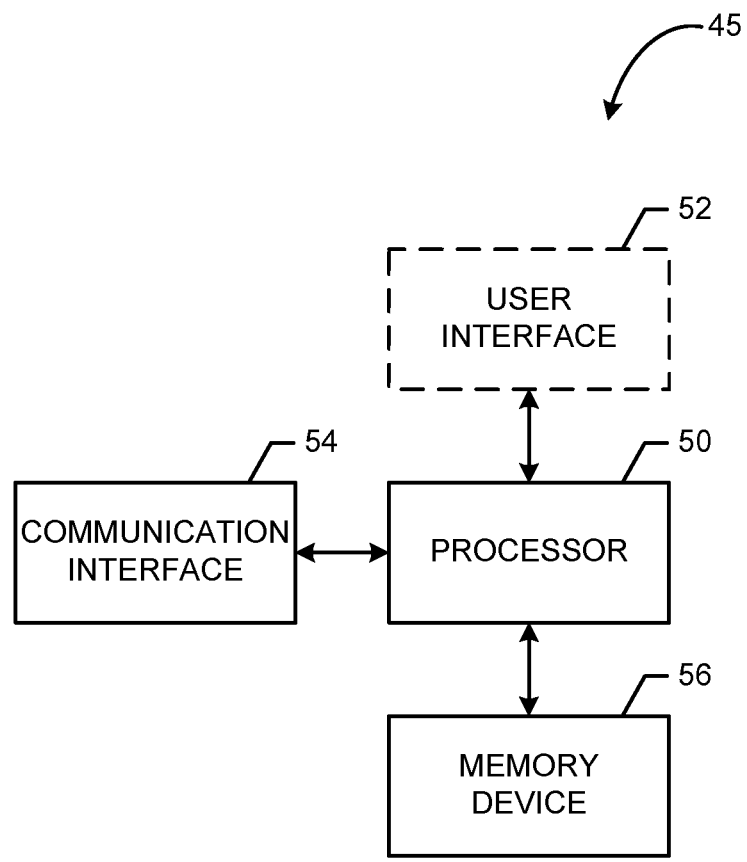
Figure 4:
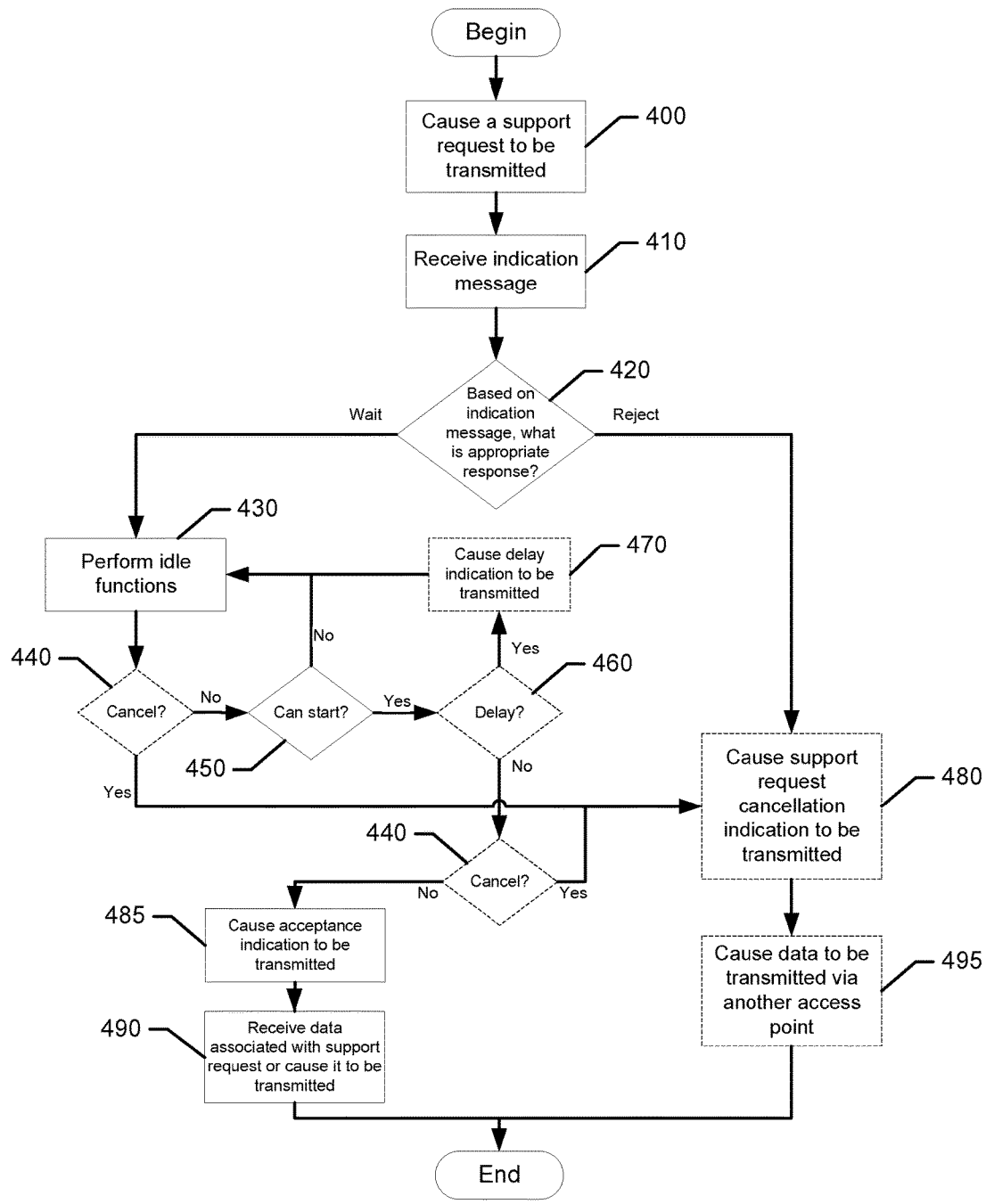
Figure 5:
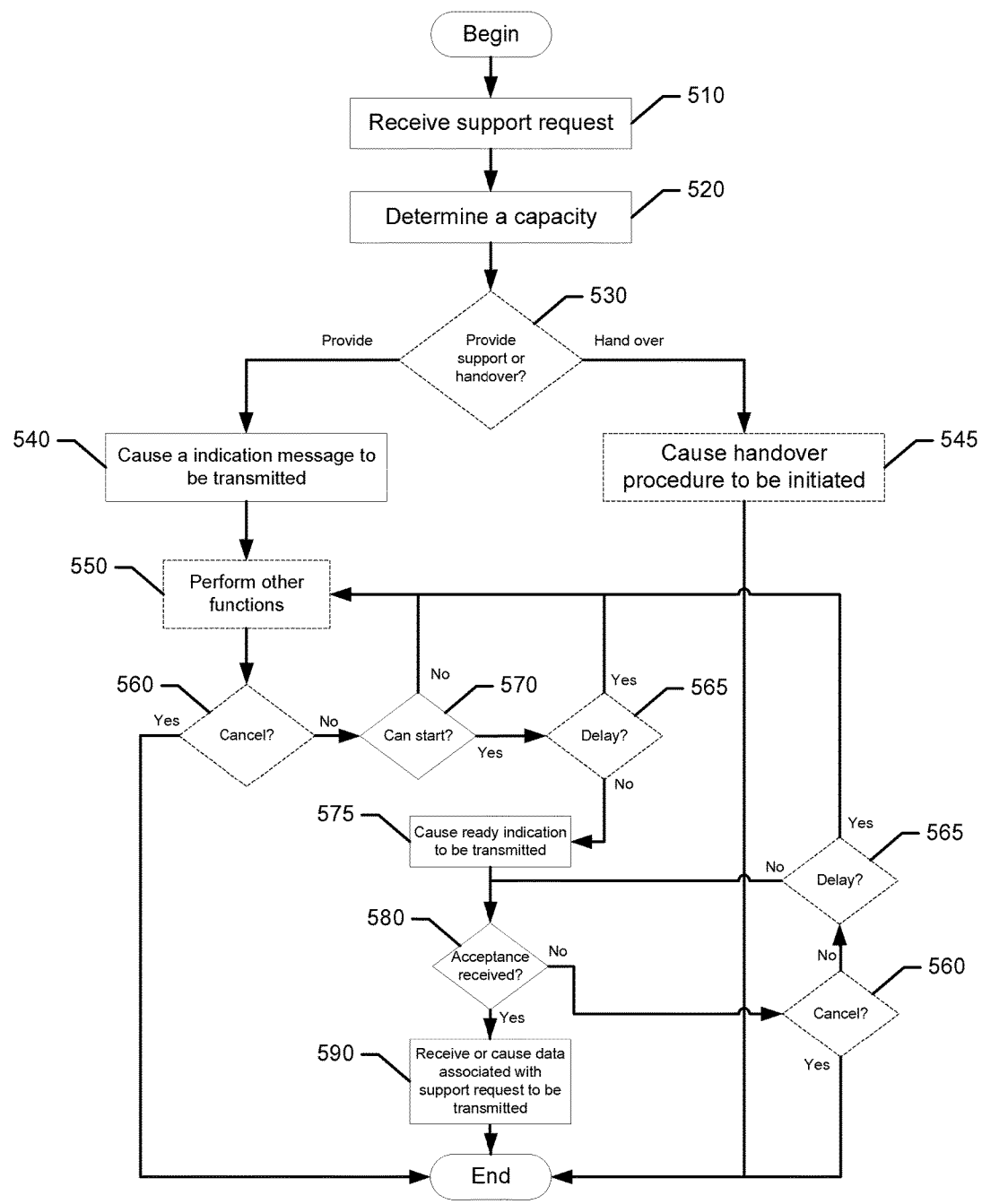
Figure 6:
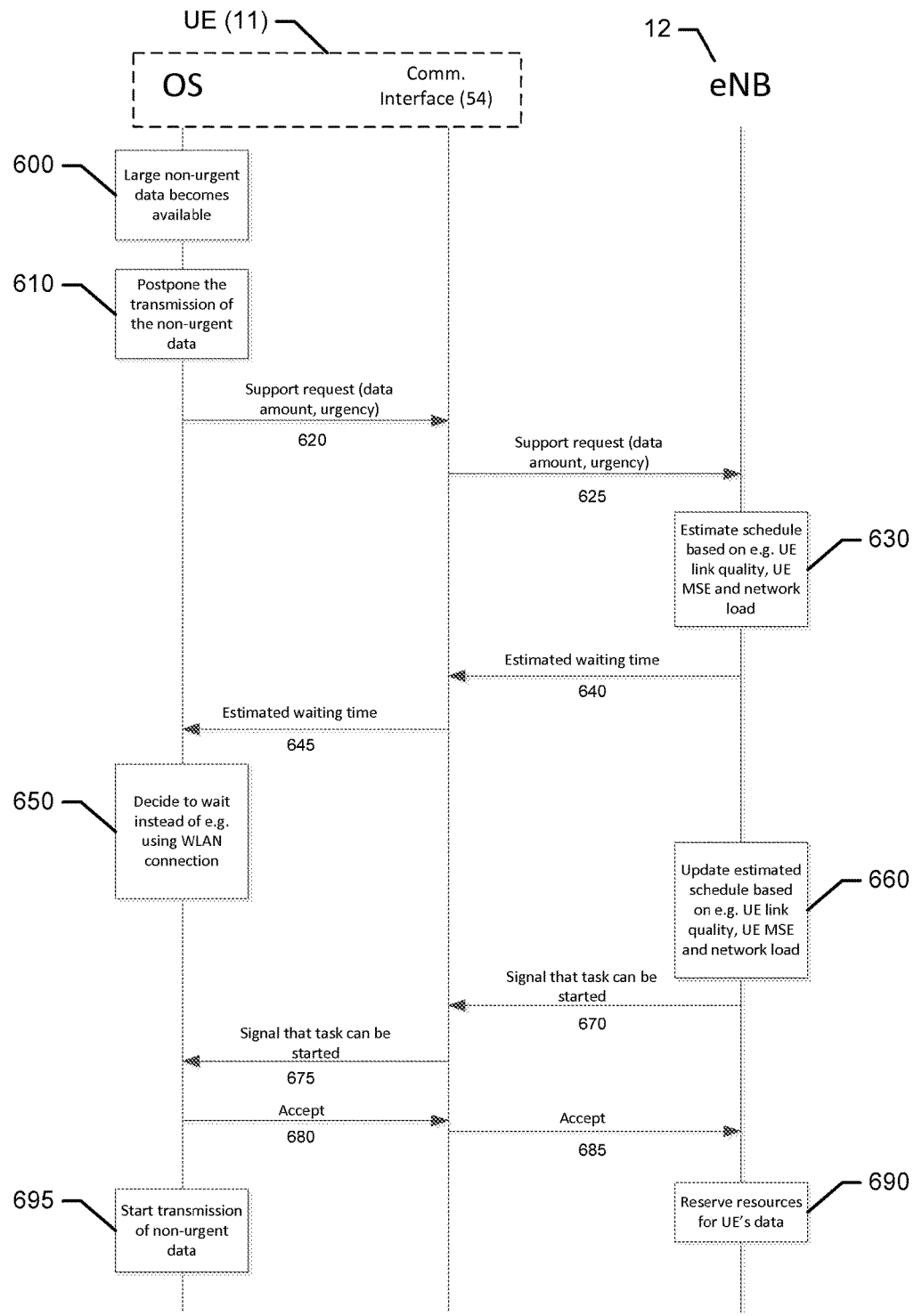

Having thus described example embodiments of the invention in general terms, reference will now be made to the accompanying drawings, which are not necessarily drawn to scale, and wherein:

FIG. 1 is a schematic representation of a system that may support example embodiments of the present invention;

FIG. 2 is a block diagram of a user equipment that may be configured to implement example embodiments of the present invention;

FIG. 3 is a block diagram of an apparatus that may be embodied by or associated with an electronic device, and may be configured to implement example embodiments of the present invention;

FIG. 4 is a flowchart illustrating operations performed in accordance with an embodiment of the present invention from the perspective of an apparatus associated with a user equipment;

FIG. 5 is a flowchart illustrating operations performed in accordance with an embodiment of the present invention from the perspective of an apparatus associated with an access point; and FIG. 6 is a signaling diagram illustrating an example signal flow in accordance with an embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, processed and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

As described below, a method, apparatus and computer program product are provided for scheduling, e.g., supporting cloud services or other tasks such as non-urgent data transfers that may contain large amount of data, or urgent data transfers that are larger than can be expected to be completed in a requested time without reserving additional capacity. As used herein, scheduling a task, e.g., a cloud service or other type of data transfer tasks, should be interpreted to include reserving capacity, managing priorities, and other means of assisting or supporting the task. It should be further understood that, as used herein, cloud services are but one example of a task involving data transfer which may benefit from embodiments of the present invention. Accordingly, use of the term cloud services or cloud service task should not be read restrictively, but should be interpreted as including any conceivable task involving the transfer of data. In this regard, the method, apparatus, and computer program product of one embodiment may allow cloud services to be efficiently scheduled with the assistance of a network, e.g., via one or more network access points or one or more other network elements such as servers, mobility management entities (MME), etc. which may be configured to handle load balancing, handovers, or the like, by providing a user equipment with an indication message for handling a request to support cloud services. In this way, the method, apparatus, and computer program may allow scheduling decisions, such as whether to wait for support from the access point or network, whether to handover to another access point or network, or whether to delay the requested task, to be more effectively made by the user equipment or the access point. The support given to UE by the access point or network may be for example reserving additional capacity, improved priority or quality of service or quality of service guarantee, improved power efficiency by scheduling the task at a time when the access point or network load is lower, improved power efficiency by scheduling tasks of all the served UEs efficiently (e.g. in a non-overlapping manner), handover to a more suitable cell, indication of available capacity or data rate, indication or estimate of when the task can be started or completed or how long the task is going to last, indication that the task cannot (or can) be completed in requested time without UE finding alternate connectivity, or signaling updates to the previously given estimates in case the situation changes.

FIG. 1 illustrates a block diagram of a system that may benefit from embodiments of the present invention. While FIG. 1 illustrates one example of a configuration of such a system, embodiments of the present invention may be implemented in numerous other system configurations. With reference to FIG. 1, however, the system may include a user equipment 11 connected to a common network 14, such as the internet, via a first access point 12. The system may also include a second access point 13 that the user equipment may connect to (the potential connection being represented by the dashed jagged line) so as to access the common network 14. Either or both of the first 12 and second 13 access points may have also respective first and second networks associated therewith (not shown). The system may also include a network device, such as network element 15, which is also connected to the common network 14, and may provide one or more cloud services to user equipment 11 via the common network 14.

User equipment 11 may be any device that is configured to communicate over a network. For example, user equipment 11 may be a mobile terminal, such as a mobile telephone, PDA, pager, laptop computer, tablet computer, data card, Universal Serial Bus (USB) dongle, or any of numerous other hand held or portable communication devices, computation devices, content generation devices, content consumption devices, or combinations thereof.

The first 12 and second 13 access points may be wired or wireless access points which may provide connected user equipments, such as user equipment 11, access to a common network 14. For example, one or both of access points 12 and 13 may be a base station, an access node, or any equivalent, such as a Node B, an evolved Node B (eNB), a relay node, or other type of access point. Access point may also be another UE or mobile device serving as an access point for other devices, sharing its connection e.g. by offering tethered Internet access. Access points 12 or 13 may also be an access point configured to provide access to a local-area network, such as a WLAN. Thus, access points 12 or 13 may be access points configured to operate in accordance with a WIFI standard, such as IEEE 802.11. Access points 12 and/or 13 may access the common network 14 via wired means, such as via fiber optic, coaxial, or Ethernet cable, digital subscriber line (DSL), or by connecting with a wireless network, such as a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network or other type of network.

Access points 12 and 13 may provide user equipment 11 with access to network 14 using different means and/or via different associated intervening networks. In an example embodiment, access point 12 may be a base station, such as an eNB, configured to provide user equipment 11 with access to network 14 via an associated LTE network, and access point 13 is an access point configured in accordance with a WIFI standard to provide user equipment 11 with access to network 14 via an associated WLAN network. According to another example embodiment, access points 12 and 13 may both be base stations, such as eNBs, configured to provide user equipment 11 with access to network 14 via an associated LTE network, each access point being associated with its own respective cell. Any number of other system configurations are possible, including configurations comprising three or more access points.

Network element 15 may be any type of network-accessible device. For example, network element 15 may be a server. Network element 15 may, for example, communicate with access points 12 and/or 13, and user equipment 11 over one or more networks, such as the common network 14, and/or respective other networks that may be associated with access points 12 and/or 13. Alternatively, network element 15 may communicate directly with, or otherwise be directly associated with, either of access points 12 or 13.

Any or all of user equipment 11, access point 12, access point 13, and network element 15 may include or be associated with an apparatus 45, such as is shown in FIG. 3, configured in accordance with embodiments of the present invention, as described below.

In one embodiment, user equipment 11 may be embodied by a mobile terminal. In this regard, a block diagram of a mobile terminal 25 that would benefit from embodiments of the present invention is illustrated in FIG. 2. It should be understood, however, that the mobile terminal 25 as illustrated and hereinafter described is merely illustrative of one type of user equipment that may benefit from embodiments of the present invention and, therefore, should not be taken to limit the scope of embodiments of the present invention. As such, although numerous types of mobile terminals, such as PDAs, mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, may readily employ embodiments of the present invention, other user equipment including fixed (non-mobile) electronic devices may also employ some example embodiments.

The mobile terminal 25 may include an antenna 17 (or multiple antennas) in operable communication with a transmitter 18 and a receiver 20. The mobile terminal 25 may further include an apparatus, such as a processor 22 or other processing device (e.g., processor 50 of the apparatus of FIG. 3), which controls the provision of signals to and the receipt of signals from the transmitter 18 and receiver 20, respectively. The signals may include signaling information in accordance with the air interface standard of the applicable cellular system, and also user speech, received data and/or user generated data. In this regard, the mobile terminal 25 is capable of operating with one or more air interface standards, communication protocols, modulation types, and access types. By way of illustration, the mobile terminal 25 is capable of operating in accordance with wireless communication mechanisms and may be able to communicate via multiple radio access technologies (RATs). For example, mobile terminal 25 may be capable of operating in accordance with any of a number of first, second, third and/or fourth-generation cellular communication protocols or the like. For example, the mobile terminal 25 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 25 may be capable of communicating in a wireless local area network (WLAN) or other communication networks, for example in accordance with one or more of the IEEE 802.11 family of standards, such as 802.11a, b, g, or n.

In some embodiments, the processor 22 may include circuitry desirable for implementing audio and logic functions of the mobile terminal 25. For example, the processor 22 may be comprised of a digital signal processor device, a microprocessor device, and various analog to digital converters, digital to analog converters, and other support circuits. Control and signal processing functions of the mobile terminal 25 are allocated between these devices according to their respective capabilities. The processor 22 thus may also include the functionality to convolutionally encode and interleave message and data prior to modulation and transmission. The processor 22 may additionally include an internal voice coder, and may include an internal data modem. Further, the processor 22 may include functionality to operate one or more software programs, which may be stored in memory. For example, the processor 22 may be capable of operating a connectivity program, such as a conventional Web browser. The connectivity program may then allow the mobile terminal 25 to transmit and receive Web content, such as location-based content and/or other web page content, according to a Wireless Application Protocol (WAP), Hypertext Transfer Protocol (HTTP) and/or the like, for example. Access to various software programs and provision of system services may, for example, be handled by an operating system (OS) implemented as program instructions stored in memory, such as memory 36 or 38, and executable by a processor, such as processor 22.

The mobile terminal 25 may also comprise a user interface including an output device such as a conventional earphone or speaker 26, a ringer 24, a microphone 28, a display 30, and a user input interface, all of which are coupled to the processor 22. The user input interface, which allows the mobile terminal 25 to receive data, may include any of a number of devices allowing the mobile terminal 25 to receive data, such as a keypad 32, a touch screen display (display 30 providing an example of such a touch screen display) or other input device. In embodiments including the keypad 32, the keypad 32 may include the conventional numeric (0-9) and related keys (#, *), and other hard and soft keys used for operating the mobile terminal 25. Alternatively or additionally, the keypad 32 may include a conventional QWERTY keypad arrangement. The keypad 32 may also include various soft keys with associated functions. In addition, or alternatively, the mobile terminal 25 may include an interface device such as a joystick or other user input interface. Some embodiments employing a touch screen display, as described further below, may omit the keypad 32 and any or all of the speaker 26, ringer 24, and microphone 28 entirely. The mobile terminal 25 further includes a battery, such as a vibrating battery pack, for powering various circuits that are required to operate the mobile terminal 25, as well as optionally providing mechanical vibration as a detectable output.

The mobile terminal 25 may further include a user identity module (UIM) 34. The UIM 34 is typically a memory device having a processor built in. The UIM 34 may include, for example, a subscriber identity module (SIM), a universal integrated circuit card (UICC), a universal subscriber identity module (USIM), a removable user identity module (R-UIM), etc. The UIM 34 typically stores information elements related to a mobile subscriber. In addition to the UIM 34, the mobile terminal 25 may be equipped with memory. For example, the mobile terminal 25 may include volatile memory 36, such as volatile Random Access Memory (RAM) including a cache area for the temporary storage of data. The mobile terminal 15 may also include other non-volatile memory 38, which may be embedded and/or may be removable. The memories may store any of a number of pieces of information, and data, used by the mobile terminal 15 to implement the functions of the mobile terminal 25.

Example embodiments of the invention will now be described with reference to FIG. 3, in which certain elements of an apparatus 45 for scheduling cloud services are depicted. In order to schedule cloud services, the apparatus 45 of FIG. 3 may be employed, for example, in conjunction with any or all of user device 11, access point 12, access point 13, and/or network element 15 of FIG. 1. Thus, functionality of apparatus 45 discussed below may, according to some embodiments, be carried out in one of the aforementioned devices. However, according to other embodiments, the functionality of apparatus 45 discussed below may be distributed across multiple devices, each comprising a respective apparatus 45.

It should also be noted that while FIG. 3 illustrates one example of a configuration of an apparatus 45 for scheduling cloud services, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 3, the apparatus 45 for scheduling cloud services may include or otherwise be in communication with a processor 50, a communication interface 54, and a memory device 56. As described below and as indicated by the dashed lines in FIG. 3, the apparatus 45 may also optionally include a user interface 52 in some embodiments, such as embodiments in which the apparatus 45 is embodied by user device 11. In some embodiments, the processor 50 (and/or co-processors or any other processing circuitry assisting or otherwise associated with the processor 50) may be in communication with the memory device 56 via a bus for passing information among components of the apparatus 45. The memory device 56 may include, for example, one or more volatile and/or non-volatile memories. In other words, for example, the memory device 56 may be an electronic storage device (e.g., a computer readable storage medium) comprising gates configured to store data (e.g., bits) that may be retrievable by a machine (e.g., a computing device like the processor 50). In the embodiment in which the apparatus 45 is embodied as a mobile terminal 25, the memory device 56 may be embodied by the memory 36, 38. The memory device 56 may be configured to store information, data, content, applications, instructions, or the like, for enabling the apparatus to carry out various functions in accordance with an example embodiment of the present invention. For example, the memory device 56 could be configured to buffer input data for processing by the processor 50. Additionally or alternatively, the memory device 56 could be configured to store instructions for execution by the processor 50.

The apparatus 45 may, in some embodiments, be embodied by or associated with a user terminal (e.g., mobile terminal 25) or a fixed communication device (e.g., network element 15, access point 12 and/or access point 13) or computing device configured to employ an example embodiment of the present invention. However, in some embodiments, the apparatus 45 may be embodied as a chip or chip set. In other words, the apparatus 45 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 45 may therefore, in some cases, be configured to implement an embodiment of the present invention on a single chip or as a single "system on a chip." As such, in some cases, a chip or chipset may constitute means for performing one or more operations for providing the functionalities described herein.

The processor 50 may be embodied in a number of different ways. For example, the processor 50 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 50 may include one or more processing cores configured to perform independently. A multi-core processor may enable multiprocessing within a single physical package. Additionally or alternatively, the processor 50 may include one or more processors configured in tandem via the bus to enable independent execution of instructions, pipelining and/or multithreading. In the embodiment in which the apparatus 45 is embodied as a mobile terminal 25, the processor 50 may be embodied by the processor 22.

In an example embodiment, the processor 50 may be configured to execute instructions stored in the memory device 56 or otherwise accessible to the processor 50. Alternatively or additionally, the processor 50 may be configured to execute hard coded functionality. As such, whether configured by hardware or software methods, or by a combination thereof, the processor 50 may represent an entity (e.g., physically embodied in circuitry) capable of performing operations according to an embodiment of the present invention while configured accordingly. Thus, for example, when the processor 50 is embodied as an ASIC, FPGA or the like, the processor 50 may be specifically configured hardware for conducting the operations described herein. Alternatively, as another example, when the processor 50 is embodied as an executor of software instructions, the instructions may specifically configure the processor 50 to perform the algorithms and/or operations described herein when the instructions are executed. However, in some cases, the processor 50 may be a processor of a specific device (e.g., a mobile terminal or network entity) configured to employ an embodiment of the present invention by further configuration of the processor 50 by instructions for performing the algorithms and/or operations described herein. The processor 50 may include, among other things, a clock, an arithmetic logic unit (ALU) and logic gates configured to support operation of the processor 50.

Meanwhile, the communication interface 54 may be any means such as a device or circuitry embodied in either hardware or a combination of hardware and software that is configured to receive and/or transmit data from/to a network, such as network 14, or any other networks associated with access points 12 and/or 13, and/or any other device or module in communication with the apparatus 45. In this regard, the communication interface 54 may include, for example, an antenna (or multiple antennas) and supporting hardware and/or software for enabling communications with a wireless communication network. Additionally or alternatively, the communication interface 54 may include the circuitry for interacting with the antenna(s) to cause transmission of signals via the antenna(s) or to handle receipt of signals received via the antenna(s). In some environments, the communication interface 54 may alternatively or also support wired communication. As such, for example, the communication interface 54 may include a communication modem and/or other hardware/software for supporting communication via cable, digital subscriber line (DSL), universal serial bus (USB) or other mechanisms. In the embodiment in which the apparatus 45 is embodied as a mobile terminal 25, the communication interface 54 may be embodied by the antenna 16, transmitter 18, receiver 20 or the like.

In some embodiments, such as instances in which the apparatus 45 is embodied by user device 11, the apparatus 45 may include a user interface 52 that may, in turn, be in communication with the processor 50 to receive an indication of a user input and/or to cause provision of an audible, visual, mechanical or other output to the user. As such, the user interface 52 may include, for example, a keyboard, a mouse, a joystick, a display, a touch screen(s), touch areas, soft keys, a microphone, a speaker, or other input/output mechanisms. Alternatively or additionally, the processor 50 may comprise user interface circuitry configured to control at least some functions of one or more user interface elements such as, for example, a speaker, ringer, microphone, display, and/or the like. The processor 50 and/or user interface circuitry comprising the processor 50 may be configured to control one or more functions of one or more user interface elements through computer program instructions (e.g., software and/or firmware) stored on a memory accessible to the processor 50 (e.g., memory device 56, and/or the like). In other embodiments, however, such as in instances in which the apparatus 45 is embodied by access point 12, access point 13, or network element 15, the apparatus 45 may not include a user interface 52.

As discussed in the background, cloud computing services may allow remote computation, software applications, data access, and/or storage services to be provided to devices over a network, such as the Internet. End-users of these services may not require knowledge of the physical location or configuration of the cloud computing system delivering the services, and some end-users may even access cloud computing services wirelessly, via RATs such as cellular and/or WI-FI communication protocols.

A particularly common, and difficult, scheduling scenario involves a user equipment (UE) with a heavy, but non-urgent traffic operation (e.g. synchronizing content such as pictures taken with device camera, cloud data, backups, software updates or downloads of map content etc.) to complete. The UE may not know when exactly it should start the heavy, but non-urgent traffic operations and, similarly, it is difficult for the network to support (e.g., schedule) the large non-urgent data, because it does not know the UE's exact needs.

Current solutions involve scheduling user traffic based on channel quality. These solutions may, for example, attempt to schedule a UE when a given channel quality is good. However, this is only a short term mechanism taking place within one cell. What is needed is a framework supporting longer time scale scheduling of cloud services, for example of non-urgent data transmission opportunities, when potentially multiple cells and/or multiple RATs (e.g. cellular and WI-FI) are available. While the large non-urgent data is pending, the scheduling of the UE's other traffic may take place normally. Depending on the situation, the transmission of non-urgent data may be done using a connection outside the control of the network (e.g. WLAN) or may be cancelled altogether if suitable connection or enough capacity does not become available.

Thus, referring now to FIG. 4, operations for providing such a framework for scheduling cloud services are depicted. In this regard and as described below, the operations of FIG. 4 may be performed by an apparatus 45, such as shown in FIG. 3, embodied by or otherwise associated with user equipment 11. In this regard, the apparatus 45 may include means, such as the processor 50, the communication interface 54 or the like, for causing a support request to be transmitted. See operation 400. The support request may, for example, be transmitted to access point 12. The support request may include, for example, information such as a size of data that may need to be transmitted by user equipment 11, such as data associated with a cloud service. The support request may also include an indication of an urgency of the request. For example, the support request may include an indication of a preferred maximum delay, such as a preferred maximum delay before the support request is started or a preferred maximum delay before the support request is completed. Many other types of information that may be useful for scheduling decisions may also or alternatively be included in the support request. In some embodiments, the information provided in the support request may not be fully accurate, but an estimate. The support request may be transmitted to the network or access point in order to schedule UE's non-urgent large data task(s). This may be for example when the amount of data associated with a task exceeds a threshold, or the delay requirement associated with the task is less stringent than a threshold, or when based on the current or predicted capacity it is estimated that the task will not be completed in time, or that due to long time to complete the task or low resource utilization efficiency the task cannot be done power efficiently.

Apparatus 45 may also include means, such as the processor 50, the communication interface 54 or the like, for receiving an indication message, e.g., a capacity indication. See operation 410. The capacity indication may, for example, be received from the access point that received the original support request, such as access point 12, and may include information regarding the access point's capacity for handling the support request. For example, the capacity indication may, for example, include an estimate of when the requested support could be started and/or completed. The capacity indication may also or alternatively include, for example, information regarding a data rate at which the requested support could be provided, a power efficiency at which the requested support would be provided, and/or a cost for providing the requested support. Many other types of information that may be useful for scheduling decisions may also or alternatively be included in the capacity indication. In some embodiments the apparatus 45 may be indicated that no additional support can be given, or for same reason no response is given to apparatus 45. In some embodiments, the support request is targeted for a network in general not a single access point, e.g. network 14 that may assist UE via one or more access points that UE is able to connect to.

Apparatus 45 may further include means, such as the processor 50, the communication interface 54 or the like, for determining an appropriate response whether to wait for or reject or delay the support task, for example, based on the indication message, e.g., capacity indication. See operation 420. For example, apparatus 45 may reject or delay the support if the estimated wait time is too high, or some other information provided in the capacity indication indicates that sub-optimal support would be provided by access point 12. Support may be rejected or delayed for example if the UE battery level is low or there is other user activity (e.g. to avoid slowing down web browsing session). Optionally, apparatus 45 may also include means, such as those mentioned above, for causing a support request cancellation indication to be transmitted, in an instance in which it is determined that the support should be rejected. See operation 480. The support cancellation indication may thus inform access point 12 that user equipment 11 no longer requires support from that access point and/or from the network 14 the access point 12 is connected to. Furthermore, apparatus 45 may include means, such as those mentioned above, for seeking support from another access point, such as access point 13, in an instance in which it is determined that the support from access point 12 should be rejected. See operation 495. Seeking support from another access point may, for example, include causing data to be transmitted via another access point. As discussed above, the other access point may, for example, employ a different RAT than the first. Alternatively, apparatus 45 may also simply cancel or delay further the support request, without seeking support from another access point. This can be the case e.g. when the UE has other higher priority activity ongoing such as when user is using web browser.

Apparatus 45 may also include means, such as the processor 50, the communication interface 54 or the like, for performing one or more idle functions in an instance in which it is determined that apparatus 45 should wait for the support task to be provided by access point 12. The said waiting may be for example due to not having available sufficiently good connection quality and/or capacity. See operation 430. The idle functions may include, for example, periodically updating UE 11's location and/or other information such as channel quality. Updating the UE 11's location may, for example, include updating the UE 11's location with a cellular network, such as on a cell level or more accurately, e.g., on a coordinate level or relative location to the access point measured, e.g., in terms of propagation path loss or signal quality, if the UE is in communication with a cellular network. If the UE 11 is connected to a cellular network, the idle functions may also include updating its location if UE 11 enters a new cell or access point, or there is other event potentially affecting the scheduling such as substantial change in channel quality, e.g., by connecting to a new access points and signaling the network. In an instance in which the UE 11 has signaled to the network that it has entered a new cell, the network, such as via an apparatus 45 associated with access point 12 or network entity 13, may recomputed and/or reschedule the support, which may include, for example, causing an updated capacity indication to be transmitted to apparatus 45 associated with UE 11. According to another embodiment, the support request may be renewed when the UE changes cells or access point. The idle functions may even further include occasionally receiving paging information from the network, such as via access point 12. Furthermore, the idle functions may include the UE 11 being kept in or maintaining a connected mode (e.g. RRC connected mode) while waiting for a support request to be fulfilled thus, for example, allowing the UE 11 to continuing transmitting data normally. The idle functions may also include causing the UE 11 to go to enter a low power consumption mode, e.g., by causing the UE 11 to enter a "sleep" mode (e.g. DRX or discontinuous reception mode) or releasing the connection between UE 11 and access point 12 (e.g. causing the UE to go from RRC connected mode to RRC idle mode, though the UE may be kept also in RRC connected mode while waiting the task). In some cases the task may also be initiated without delay if, for example, the access point 12 indicates so.

It should be understood that apparatus 45's determination of what an appropriate response is, e.g., whether to reject or accept support from the access point it has requested support from, may also or alternatively be based on information besides the capacity indication. For example, apparatus 45 may take into account historical information or measurements of its surroundings when making the determination. As an example of using historical information, the UE may determine to reject the support/assistance because the offered support/capacity is lower than the typical level of service it can expect to obtain within the delay constraints of the task based on previous monitoring e.g. the connection quality or available capacity at a certain time of the day, or in a certain location (geographic, or connected access point).

As indicated in FIG. 4, apparatus 45 associated with UE 11 may, after determining that waiting is an appropriate response, determine whether the support request should still be proceeded with or should now be canceled. See operation 440. Apparatus 45 may make such a determination based on any number of factors. For example, apparatus 45 may determine that the support request should be canceled or delayed based on UE 11 having a low battery level, or based on certain actions being taken by a user of UE 11 (e.g. user has an active browsing session or other interactive or higher priority activity ongoing that should not be slowed down). According to another example embodiment, apparatus 45 may determine that the support request should be canceled based on determining that a better connection is available. For example, apparatus 45 may determine that another access point, such as access point 13, is able to better satisfy the support request, such as at a faster or more reliable transmission rate, or after a shorter wait time. Apparatus 45 may determine that a better connection is available, for example, by performing a radio scan, and/or by causing additional support requests to be transmitted to addition access points. Apparatus 45 may also compare one or more available alternative connections to determine whether a better connection is available and therefore whether to cancel the pending request and request support via the better connection. As a specific example, if apparatus 45 associated with UE 11 is currently waiting for a support request to be fulfilled by an access point 12 associated with a cellular network, and suddenly UE 11 is carried in range of a WI-FI access point, such as access point 13, apparatus 45 may determine that it should cancel the pending request with access point 12 and instead seek support via WI-FI access point 13. As with the determination to reject support discussed above, a determination to cancel may optionally be followed by causing a support request cancellation indication to be transmitted. See operation 480. In some embodiments the network or the access point determine that the UE is supported/assisted best by another access point, and the network or the access point may initiate the handover of the UE, or wait until the conditions become more suitable.

It should be understood that FIG. 4 merely depicts an example of two points in the operations of apparatus 45 associated with UE 11 at which a cancellation decision may logically take place. In actuality, cancellation decision 440 may occur at many possible points in said operations, and thus FIG. 4 should not be interpreted as limiting the moments in time when apparatus 45 may determine that a request should be canceled. Thus, for example, it is not necessarily the case that one or more idle functions must be completed prior to apparatus 45 determining that a pending request should be canceled. It should be further understood that the decision to cancel may originate from access point 12 as well, such that cancellation operation 440 may also comprise a determining whether the task has been cancelled, such as whether a cancellation indication has been received.

Apparatus 45 may further include means such as the processor 50, the communication interface 54 or the like, for determining whether the requested support (or task associated with the support request) can begin. See operation 450. According to an example embodiment, apparatus 45 may make such a determination based on receiving a ready indication, such as from access point 12. The ready indication may thus signal to apparatus 45 associated with UE 11 that access point 12 is now ready to provide the requested support. The ready indication may indicate that the network or access point is ready to provide e.g. additional capacity, increased priority, guaranteed service, or other assistance/support that improves the quality of service. According to another example embodiment, apparatus 45 may determine that the requested support can begin based on the received capacity indication. For example, apparatus 45 may compare an estimated time until the support task can be started contained in the capacity indication with an elapsed time since the capacity indication was received or sent.

As further indicated in FIG. 4 apparatus 45 associated with UE 11 may determine whether it should proceed with or delay starting the requested support task. See operation 460. For example, apparatus 45 may determine that starting the support task should be delayed based on a status of the UE, such as a battery level or a current usage of the UE. For example, apparatus 45 may determine that a user is using a web browser or otherwise using UE 11 to perform a task that would be slowed down or otherwise impeded by permitting the support task to start and, accordingly, may determine that it should be delayed. If it is determined that the support task should be delayed, apparatus 45 may perform one or more idle functions, as discussed above. Optionally, a determination that the support task should be delayed may be followed by causing a delay indication to be transmitted. Thus, apparatus 45 may signal to access point 12 that it wishes to delay the support task from starting. Access point 12 may then respond accordingly, such as by rescheduling the support task, e.g., by re-determining a capacity and causing a new capacity indication to be transmitted. As with the cancellation determination 440 discussed above, the delay determination 460 may also and/or additionally occur at points in the operations of apparatus 45 associated with UE 11 that are different from what is depicted in FIG. 4. It should be further understood that the decision to delay may originate from access point 12 as well, such that delay operation 460 may also comprise determining whether the task has been delayed, such as by determining whether a delay indication has been received from access point 12.

Apparatus 45 may further include means such as the processor 50, the communication interface 54 or the like, for causing an acceptance indication to be transmitted, in an instance in which apparatus 45 has determined that the support task can start and has not determined that the support task has been or should be delayed or canceled. See operation 485. Apparatus 45 may also include means, such as those discussed above, for causing the support task to be carried out, e.g., by causing data associated with the support task to be transmitted, such as to access point 11, or by receiving data associated with the support task. See operation 490.

Thus, having described the operations of example embodiments of the claimed invention for scheduling cloud services from the perspective of apparatus 45 associated with UE 11, corresponding operations of an apparatus 45 associated with an access point, such as access point 12, will now be discussed. In this regard, and with reference to FIG. 5, apparatus 45 associated with access point 12 may include means, such as the processor 50, the communication interface 54 or the like, for receiving a support request. See operation 510. As previously discussed, the support request may contain, for example, a size of data to be transmitted and associated with the request, along with an indication of an urgency of the request (i.e. in how much time it should be completed, expressed e.g. in minutes or more roughly in categories such as e.g. 1 minute, 15 minutes, 1 hour, 1 day etc.).

Apparatus 45 may further include means, such as the processor 50, the communication interface 54 or the like, for determining a capacity to provide the requested support, e.g., for scheduling the support task associated with the requested support. See operation 520. Determining the capacity may include, for example, determining an estimated time until the support task could be started and/or completed. The capacity may also, or alternatively, include an estimate of a data rate, a power efficiency, and/or a cost associated with carrying out the support task. The capacity may be determined based on, for example: the quality of a communication link with UE 11, e.g., the SINR (signal to interference noise ratio), transmission error rate, and/or a data rate of the communication link; the UE MSE (mobility state estimation); a network load; a mobility state of the UE; and/or other parameters. According to another example embodiment, apparatus 45 associated with access point 12 may wait until remote data has been received to a local proxy or a buffer, such as if the support task involves a downlink (DL) transfer, to initiate the requested task. This may lead to more efficient data transfer because the data goes from a proxy (or even a local access point buffer) to UE 11, instead of from the server to UE 11. The overall delay may not be shortened, but the duration of active data transmission and reception between access point and UE 11 may be shortened, which may allow more power efficient operation.

Apparatus 45 may also include means, such as the processor 50, the communication interface 54 or the like, for determining whether to provide the requested support or not. See operation 530. Apparatus 45 may make such a determination based on, for example, the determined capacity. A determination to not support the task may comprise, for example, a determination to handover the UE to another access point, such as access point 13, so that the other access point may support the task. According to an example embodiment, apparatus 45 may determine that a handover should be performed, for example, based on the support request, a network load, or other considerations. For example, if access point 12 has a high load, apparatus 45 associated with access point 12 may determine that causing a handover operation resulting in UE 11 being handed over to another cell with a lower load is appropriate given the amount of traffic (and its load impact) necessary for completing UE 11's requested task in time. As an example, this can be the case for a UE connected to an access point serving a macro cell, but which is in a position to establish a connection to a smaller cell (HeNB (home eNodeB), pico cell, WiFi access point etc.) as well. Handover is not needed, for example, if the UE's known/predicted future traffic can be handled by the access point 12 within the requested time. Thus, apparatus 45 may further include means, such as the processor 50, the communication interface 54 or the like, for, in an instance in which apparatus 45 determines that a handover should be performed, causing a handover procedure to be initiated, such that another access point may provide the requested support task. According to an example embodiment, apparatus 45 may be associated with, and configured to control, two or more access points, such as access points 12 and 13. Thus, causing the handover procedure to be initiated may comprise causing a connection to be established between the other access point, e.g., access point 13, and UE 11, so that access point 13 may provide the requested support task, such as by receiving or transmitting data associated with the support task. According to another example embodiment, apparatus 45 may not be configured to control the access point to which a handover is being performed, such that causing the handover procedure to be initiated comprises signaling to the UE 11 that it should initiate a handover procedure on its own. Thus, certain ones of the above embodiments may allow the UE's needs to be better supported and/or provide better network load balancing by strategically handing over UEs requesting support.

Apparatus 45 may further include means, such as the processor 50, the communication interface 54 or the like, for causing a capacity indicator to be transmitted, such as to UE 11. See operation 540. The capacity indicator comprises information related to the capacity determined in operation 520. Optionally, the capacity indicator may only be caused to be transmitted in an instance in which apparatus 45 has determined that support should be provided. Apparatus 45 may also include means, such as the processor 50, the communication interface 54 or the like, for performing other functions until the support task can begin. See operation 550. The other functions may include, for example, network-side functions correlating to the idle functions performed by apparatus 45 associated with UE 11 discussed above. For example, the other functions may include receiving location updates from UE 11, rescheduling the support task, such as by updating and causing the capacity indicator to be transmitted, and causing paging information to be transmitted or the network may signal the UE when to actually start the task. The other functions may also include carrying out other support tasks, such as for other UEs, and carrying out other scheduling and/or transmission operations.

Like its counterpart associated with UE 11, apparatus 45 associated with access point 12 may include means, such as the processor 50, the communication interface 54 or the like, for determining whether to cancel a support task and/or whether the support task has been canceled by UE 11. See operation 560. Similarly, apparatus 45 associated with access point 12 may also include means, such as the processor 50, the communication interface 54 or the like, for determining whether to delay a support task and/or whether the support task has been delayed by UE 11. The determination of whether to cancel or delay a support task may, for example, be based on a support request previously or subsequently received from some other UE, network or transmission conditions, system load, or any number of other factors or considerations. As with FIG. 4, the placement of the cancellation determinations 560 and delay determination 565 is merely illustrative and should not be interpreted as limiting the scope of the present invention with regards to when a determination to cancel or delay a task, or a determination that a task has been canceled or delayed, may take place.

Apparatus 45 may further include means, such as the processor 50, the communication interface 54 or the like, for determining whether the support task can start. See operation 570. Apparatus 45 may make such a determination based on, for example, available resources, an elapsed time since the capacity indicator was transmitted, or any number of other factors or considerations. Apparatus 45 may further include means, such as those mentioned above for, in an instance in which the support task can start and has not been delayed or canceled, causing a ready indication to be transmitted. See operation 575. Apparatus 45 may also include means, such as the above, for determining whether an acceptance has been received. See operation 580. Finally, apparatus 45 may also include means, such as those discussed above, for providing the requested support, such as by receiving data associated with the requested support, or causing data associated with the requested support to be transmitted, in response to receiving the acceptance. See operation 590.

Turning now to FIG. 6, an example is depicted of the signaling which may be exchanged according to an example embodiment between a UE, such as UE 11, and an eNB, such as access point 12. The signaling may be enabled, for example, by separate apparatuses, such as apparatus 45, respectively associated with UE 11 and access point 12. Note that as depicted in FIG. 6, UE-bound signals are finally received, originate from, and are caused to be transmitted by an operating system (OS). The OS may, for example, be implemented in apparatus 45 associated with UE 11, such as via program code instructions embodied in memory, such as memory 56, executable by a processor, such as processor 50. The signals may be transmitted and initially received, for example, via communication interface 54 or the like.

Thus, UE 11, e.g., via the OS as implemented above, may determine that a cloud service support task involving transmitting a large amount of non-urgent data has become available. See operation 600. For example, the OS may determine that synchronization content, such as pictures taken with device camera, cloud data, backups, software updates or map data is required. The OS may then determine, such as based on the amount of data or the urgency, that the cloud service support task involving transmitting the large amount of non-urgent data should be postponed. See operation 610. At this point, the OS may generate a signal requesting support, and provide this for transmission, such as by providing it to communication interface 54 or the like. See operation 620. The support request may then be transmitted to access point 12, See operation 625. Upon receiving the support request, access point 12 may then determine a capacity, such as by estimating a schedule, e.g., a start or completion time, for the task. See operation 630. The capacity determination may, for example, be based on UE link quality, UE MSE, or network load. Having determined a capacity, access point 12 may then cause a capacity indication, such as an estimated waiting time before the task can be started, to be transmitted to UE 11. See operation 640. UE 11, having received the capacity indication, such as via communication interface 54 or the like, may pass this information to the OS. See operation 645. The OS may then determine whether to wait to be supported by access point 12. See operation 650. If a determination is made to wait, access point 12 may, such as via memory 56 and processor 50 of apparatus 45 associated therewith, update the estimated schedule during the wait period. See operation 660. The estimated schedule may, for example, be updated based on a UE link quality, UE MSE, and/or network load. Once access point 12 determines, such as via the means just mentioned, that the support task can be started, it may cause a ready indication to be sent to UE 11. See operation 670. Having received the ready indication, such as via communication interface 54 or the like, UE 11 may then pass this information to the OS. See operation 675. If the support is accepted, the OS may generate an acceptance indication signal which indicates acceptance of the support and provide this signal for transmission, such as by providing it to communication interface 54 or the like. See operation 680. The acceptance indication may then be transmitted to access point 12, See operation 685. In response to receiving the acceptance indication, access point 12 may then reserve resources for the data associated with the UE 11's support request. See operation 690. In response to sending the acceptance indication, or, according to another embodiment, in response to receiving an indication that the resources have been reserved (not shown), UE 11 may cause data associated with the support task to be transmitted, and/or may begin receiving data associated with the support task. See operation 695.

As described above, FIGS. 4 and 5 illustrate flowcharts of an apparatus 45, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 56 of an apparatus 45 employing an embodiment of the present invention and executed by a processor 50 of the apparatus 45. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or enhanced. Furthermore, in some embodiments, additional optional operations may be included, some of which are indicated by dashed lines in FIGS. 4 and 5. Modifications, additions, or enhancements to the operations above may be performed in any order and in any combination.

The method, apparatus 45 and computer program product described above may provide many advantages. For example the method, apparatus 45 and computer program products may benefit a network, by informing it that it is going to be receiving or transmitting a large amount of data. This prior warning may allow the network to control/schedule the synchronization of different UEs to allow power-efficient operation and to balance network load. For example, the network may schedule heavy operations during off-peak times, such as at night. The network can also decide, for example, to handover the UE to another cell before the sync, which may also reduce network strain. The method, apparatus 45 and computer program products may also benefit a UE, by enabling increased power efficiency and more predictable data rates and transmission/reception capacity. A UE may also receive an estimate before beginning a task, such as a large data synchronization task, of whether the task can be ready to start or can be completed in a reasonable time. In addition, a UE may receive information to support a decision between different connection options, e.g., between LTE and WLAN, for a task.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory storing program code instructions, the at least one memory and program code instructions, with the at least one processor, cause the apparatus to at least:
   cause a support request to be transmitted, the support request including at least an indication of an amount of data associated with a task or an indication of an urgency of the task;
   receive an indication message;
   determine, based at least in part on the indication message, whether to wait for or reject the task; wherein
      cause the support request to be transmitted comprises causing the support request to be transmitted to a first access point and receive the indication message comprises receiving the indication message from the first access point; and
      wherein the apparatus is further caused to, in an instance in which it is determined to reject the task, receive from or cause to be transmitted to a second access point, the data associated with the task;
   determine, based at least in part on a status of user equipment associated with the apparatus, whether to proceed with or delay the task; and
   in an instance in which it is determined to delay the task:
      perform an idle function or cause a delay indication to be transmitted; and
      receive an updated capacity indication in conjunction with rescheduling to support the task.

2. The apparatus of claim 1, wherein the apparatus is further caused to, in an instance in which it is determined to wait for or reject the task:
   perform one or more idle functions,
   receive a ready indication,
   determine whether to proceed with or cancel the task, and
   in an instance in which it is determined to proceed with the task:
      cause an acceptance indication to be transmitted, and
      receive or cause to be transmitted, the data associated with the task.

3. The apparatus of claim 2, wherein the apparatus is caused to cause the support request to be transmitted by causing the support request to be transmitted to the first access point and caused to receive the indication message by receiving the indication message from the first access point; and
   wherein the apparatus is further caused to, in an instance in which it is determined to cancel the task, receive from or cause to be transmitted to the second access point, the data associated with the task.

4. The apparatus of claim 2, wherein the determination of whether to proceed with or cancel the task is based at least in part on at least one of: historical information, a measurement of a surrounding area, whether a better connection is available, a battery level, or a user activity.

5. The apparatus of claim 2, wherein the one or more idle functions include: updating a location, connecting to a new cell, receiving paging information, causing a connected mode to be maintained, and causing a low power consumption mode to be entered.

6. The apparatus of claim 1, wherein the determination of whether to wait for or reject the task is based at least in part on at least one of: historical information, a measurement of a surrounding area, whether a better connection is available, a battery level, or a user activity.

7. An apparatus comprising a processor and a memory storing program code instructions, the memory and program code instructions, with the processor, cause the apparatus to at least:
   receive a support request, the support request comprising at least one of an indication of an amount of data associated with a task or an indication of an urgency of the task;
   determine, based on the support request, a capacity to support the task;
   cause an indication message comprising an indication of the capacity to be transmitted;
   determine whether supporting the task can be started;
   in an instance in which it is determined that supporting the task can be started, determine, based at least in part on a status of a user equipment associated with the apparatus, whether to proceed with or delay the task and, in an instance in which it is determined to delay the task, reschedule the task and cause an updated capacity indication to be transmitted;
   in an instance in which it is determined to proceed with the task, cause a ready indication to be transmitted, and
   in an instance in which an acceptance indication has been received, support the task by receiving or causing to be transmitted, the data associated with the task.

8. The apparatus of claim 7, wherein the apparatus is further caused to, prior to causing the indication message to be transmitted, determine whether to support the task or perform a handover;
   and, in an instance in which it is determined to perform a handover, cause a handover procedure to be initiated.

9. The apparatus of claim 8, wherein the determination of whether to support the task or perform the handover is based on the support request or a network load.

10. A computer program product comprising a non-transitory computer readable storage medium having program code portions embodied therein, the program code portions, upon execution, cause an apparatus to at least:
   cause a support request to be transmitted, the support request including at least an indication of an amount of data associated with a task or an indication of an urgency of the task;
   receive an indication message; and
   determine, based at least in part on the indication message, whether to wait for or reject the task; wherein
      cause the support request to be transmitted comprises causing the support request to be transmitted to a first access point and receive the indication message comprises receiving the indication message from the first access point; and
   wherein the program code portions, upon execution, further cause the apparatus to, in an instance in which it is determined to reject the task, receive from or cause to be transmitted to a second access point, the data associated with the task;
   determine, based at least in part on a status of a user equipment associated with the apparatus, whether to proceed with or delay the task; and
   in an instance in which it is determined to delay the task, perform an idle function or cause a delay indication to be transmitted; and
   receive an updated capacity indication in conjunction with rescheduling to support the task.

11. The computer program product of claim 10, wherein the apparatus is further caused to, in an instance in which it is determined to wait for or reject the task:
   perform one or more idle functions,
   receive a ready indication,
   determine whether to proceed with or cancel the task, and in an instance in which it is determined to proceed with the task:
     cause an acceptance indication to be transmitted, and
     receive or cause to be transmitted, the data associated with the task.

12. The computer program product of claim 11, wherein the apparatus is caused to cause the support request to be transmitted by causing the support request to be transmitted to the first access point and caused to receive the indication message by receiving the indication message from the first access point; and
   wherein the program code portions, upon execution, further cause the apparatus to, in an instance in which it is determined to cancel the task, receive from or cause to be transmitted to the second access point, the data associated with the task.

13. The computer program product of claim 11, wherein the determination of whether to proceed with or cancel the task is based at least in part on at least one of: historical information, a measurement of a surrounding area, whether a better connection is available, a battery level, or a user activity.

14. The computer program product of claim 10, wherein the apparatus is caused to cause the support request to be transmitted by causing the support request to be transmitted to a first access point and caused to receive the indication message by receiving the indication message from the first access point; and
   wherein the program code portions, upon execution, further cause the apparatus to, in an instance in which it is determined to reject the task, receive from or cause to be transmitted to a second access point, the data associated with the task.

15. The computer program product of claim 10, wherein the determination of whether to wait for or reject the task is based at least in part on at least one of: historical information, a measurement of a surrounding area, whether a better connection is available, a battery level, or a user activity.

* * * * *